Nov. 10, 1964     K. H. OLSON ETAL     3,156,633
FILM-FORMING METAL CAPACITORS
Filed Feb. 21, 1962     2 Sheets-Sheet 1
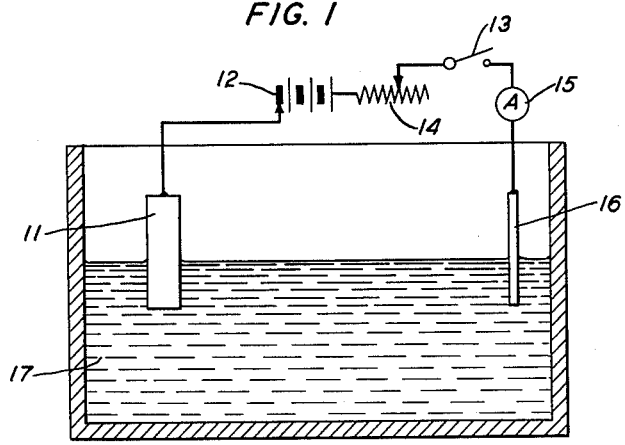
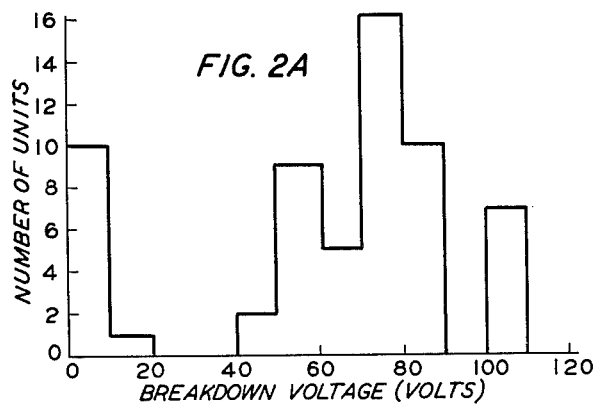
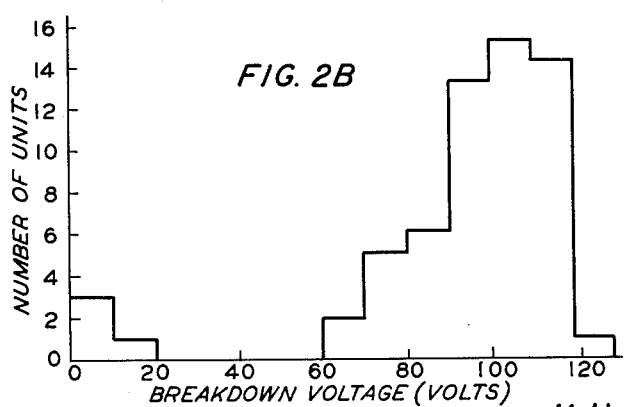
INVENTORS *K. H. OLSON*
*N. SCHWARTZ*
BY
ATTORNEY

United States Patent Office 3,156,633
Patented Nov. 10, 1964

3,156,633
FILM-FORMING METAL CAPACITORS
Karel H. Olson, Allentown, Pa., and Newton Schwartz, New Providence, N.J., assignors to Bell Telephone Laboratories, Incorporated, New York, N.Y., a corporation of New York
Filed Feb. 21, 1962, Ser. No. 174,868
5 Claims. (Cl. 204—38)

This invention relates to an improved method of fabricating capacitors which utilize a film-forming metal electrode. More specifically, the improvement is manifested by an increase in the yield of capacitors having desirably low leakage currents.

There is a group of metals including tantalum, aluminum, niobium, hafnium and zirconium, termed film-forming metals whose oxides are known to be excellent dielectric materials well suited for capacitor use. An inherent advantage of the use of one of these oxides as the dielectric layer in a capacitor is the facility with which it may be produced. Thus, a tightly adherent, impervious, uniform oxide film may be produced on the surface of a body of a film-forming metal by conventional electrolytic anodization techniques. The insulated metal body is then employed as one electrode of the particular capacitor to be constructed.

Anodized electrodes of a film-forming metal are employed in the fabrication of three general types of capacitors. The wet electrolytic is the prototype of this group, and consists simply of an anodized electrode immersed in a suitable liquid electrolyte. The container which holds the anodized electrode and electrolyte is usually employed as the second electrode of the capacitor. Where the anodized electrode consists of a length of foil, the counter electrode and spacer are wound with the anode.

The second type of capacitor, developed after the wet electrolytic, is the solid electrolytic capacitor. This capacitor frequently takes the form of an anodized porous body which is coated successively with a layer of manganese dioxide and a layer of an electrically conductive metal, the latter serving as the second electrode. The manganese dioxide serves the purpose of the liquid electrolyte in the wet electrolytic, and facilitates the healing or rebuilding of discontinuities or irregularities in the dielectric oxide film.

The most recent capacitor, referred to herein as the printed capacitor, is described in detail in U.S. Patent 2,993,266, granted July 25, 1961, to R. W. Berry. This capacitor is constructed by depositing a layer of a film-forming metal on a substrate, for example, by sputtering or vacuum evaporation, such techniques being known as condensation, anodizing the deposited layer to form an oxide film, and finally depositing a counter-electrode in direct contact with the anodized film.

The evolution of the printed capacitor was intimately bound up with problems directly affecting the dielectric oxide films. The wet electrolytic has the advantage of healing any imperfections in the dielectric film which are either present initially or which subsequently occur during the operation of the capacitor. However, this capacitor suffers from many disadvantages which are generally due to the fact that the capacitor employs a relatively large volume of liquid electrolyte. The solid electrolytic capacitor, by substituting a thin layer of manganese dioxide for the liquid electrolyte, is superior in many ways to the wet electrolytic type.

The printed capacitor represents a later stage in the development of capacitors employing an electrode consisting of a film-forming metal. The manner in which the film-forming metal is produced apparently minimizes the presence of defects or irregularities in the anodized dielectric film. Since electrolytes are employed in the other two types of capacitors to alleviate the undesirable effects caused by the imperfect dielectric film, the high quality dielectric of the printed type of capacitor obviates the need for any electrolyte medium. Accordingly, the simplicity and ease of fabrication of this type of capacitor renders it eminently well suited for use in printed circuits.

Recently a technique, which is described in detail in copending application Serial No. 841,337, filed September 21, 1959, now Patent No. 3,079,536, by D. A. McLean, which is incorporated herein by reference was developed for improving the quality of the dielectric oxide layer of film-forming electrodes which are employed in the fabrication of capacitors. It was thus determined that yield was improved by removal of occasional irregularities and defects in the anodized film by contacting the anodized electrode with a non-aqueous electrolyte containing a relatively low concentration of one or more halide ions, biasing the electrode positively for a short period of time, and reanodizing the electrode and depositing a counter-electrode thereon. The net result of such treatment is a decrease in the leakage current and a consequent increase in the yield of capacitors meeting the required leakage current standards.

The utility of this technique has been conclusively demonstrated in higher initial yields of capacitors as well as in decided improvement in life test performance. Despite these improvements and the impressive initial conversion of shorted capacitors to acceptable capacitors, some films are still produced which are not completely amenable to this etching technique. The importance of being able to cure all defects is of critical value for integrated multiple capacitor circuits where high yields are required.

The present invention is directed to a method for improving the quality of the dielectric oxide layer of film-forming electrodes which are employed in the fabrication of capacitors in accordance with the technique described in the aforementioned copending application. It has been determined that the defects in the oxide film, not eliminated by anodic etching, can be cured by cathodic etching prior to the anodic etching. The net result of such treatment is a further decrease in the level of leakage current and a consequent increase in the yield of capacitors meeting the required leakage current standards.

In accordance with the present invention, the anodized electrode is contacted with an electrolyte which readily liberates hydrogen. The electrode is then negatively biased for a short period of time during which positively charged hydrogen ions, attracted to the cathode, react with certain portions of the underlying film-forming metal electrode. Such reactions, which cause the film-forming metal to go into solution, occur at imperfection sites of the anodized film which are generally not healed during the anodic etching step.

Following, the film-forming electrode is contacted with a non-aqueous electrolyte containing a relatively low concentration of one or more halide ions. The electrode is then positively biased for a short period of time during which negatively charged halogen ions, attracted to the anode, react with certain portions of the underlying film-forming metal electrode at imperfection sites not healed during the cathodic etching step.

Following the etching steps, the film-forming electrode is again anodized in one of the conventional aqueous electrolytes to oxidize the portions of the electrode surface which were exposed by the etching procedures.

The inventive etching step may be introduced into the manufacturing process of the wet electrolytic, solid electrolytic and printed circuit capacitors, and in each case will result in an overall decrease in the leakage current of capacitors so produced.

Other advantages and various features of the invention will become apparent by reference to the following description taken in conjunction with the accompanying drawing forming a part thereof, and from the appended claims wherein:

FIG. 1 is a schematic drawing of an electrode being cathodically etched in accordance with the present invention;

FIG. 2A is a histogram of capacitor breakdown voltage before cathodic etching, on coordinates of number of units against breakdown voltage in volts;

FIG. 2B is a histogram of capacitor breakdown voltage after cathodic etching on coordinates of number of units against breakdown voltage in volts;

Figure 3A:
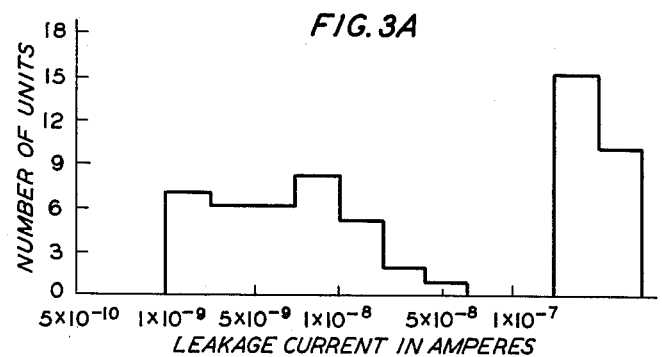
FIG. 3A is a histogram of capacitor leakage current at 75 volts before cathodic etching on coordinates of number of units against leakage current in amps.

With reference now more particularly to the drawing, FIG. 1 shows anodized electrode 11, for example, constructed of tantalum, connected to the negative side of variable direct current power supply 12. Completing the electrical circuit are switch 13, rheostat 14, ammeter 15, anode 16, typically of platinum or any other inert anode, and electrolyte 17 disposed as shown in the figure. Electrolyte 17 is a liquid from which hydrogen is readily available, such solutions typically having a pH less than 9.

The inventive etching step is initiated by closing switch 13 thereby biasing electrode 11 negatively. If the dielectric oxide film covering cathode 11 were perfect, essentially no current would flow through the circuit. However, certain discontinuities or defects which may be present in the dielectric film serve as conducting paths for current flow. At such sites, the hydrogen ions easily penetrate microfissures in the oxide film, thereby embrittling the underlying tantalum and causing it to enter solution. The electrolytic etching action is continued for a short period of time and is interrupted by opening switch 13. The treated electrode is then removed from the apparatus shown in FIG. 1, placed in a similar apparatus containing an electrolyte which is a non-aqueous liquid containing a low concentration of one or more of the halogen ions and biased positively for a short period of time in accordance with the procedure outlined in the above-noted copending application. The treated electrode is then reanodized in a conventional electrolyte to oxidize exposed surfaces of the electrode.

The cathodic etching procedure consists of immersing an anodized electrode into an electrolyte having a pH value up to approximately 9. The electrode is then biased cathodically at a potential within the range of 5 to 50 percent of the original anodizing voltage. The etching is permitted to proceed for a time period within the preferred range of 0.1 to 10 minutes after which the electrode is anodically etched as discussed above.

It is advantageous to maintain the cathodic etching current density at a value below 10 milliamperes per square centimeter and preferably in the range of 0.1 to 5 milliamperes per square centimeter. Treatment at current densities greater than the stated value tends to have an adverse effect upon the dielectric oxide film caused by the excessive heat generated at the imperfection sites.

The duration of the cathodic etching step is not a critical factor and the limits set forth above may be exceeded. However, longer etching times tend to increase the effective series resistance and decrease the capacitance, the loss of electrode material being responsible for both affects. The use of cathodic etching times below 0.1 minute tends to minimize the advantages gained by the inventive process.

The cathodic etching electrolyte suitable for use in the present invention may be composed of any solvent having a pH less than 9, for example, a solution of citric acid, oxalic acid, boric acid, phosphoric acid, sodium sulfate, etc.

The advantages of the present invention are best appreciated by comparison of capacitors produced with and without the inventive cathodic etching step. Sixty capacitors were prepared by the following procedure:

A layer of tantalum approximately 5000 Angstroms in thickness was sputtered onto a glass substrate in a desired configuration. The tantalum film was then anodized at a potential of 100 volts in an electrolyte consisting of 1 part oxalic acid, 2 parts water and 3 parts ethylene glycol by weight. The capacitor was then washed and dried and immersed in an etching solution consisting of 0.1 percent by weight citric acid in distilled water. The capacitor was then biased cathodically at a potential of 10 volts employing an apparatus similar to that shown in FIG. 1. The etching step was continued for approximately 5 minutes, the etching current density being equal to approximately 1 milliampere per square centimeter.

Next, the electrode was washed and dried and immersed in an etching solution consisting of 0.01 percent by weight of aluminum chloride in methanol. The electrode was then biased anodically at a potential of 90 volts for 0.1 minute.

Following the anodic etching step, the electrode was washed, dried and reanodized at a potential of 100 volts in an electrolyte consisting of 1 part oxalic acid, 2 parts water and 3 parts ethylene glycol by weight for a period of approximately 30 minutes. A counter-electrode of gold was then deposited in contact with the anodized surface.

Comparison of the breakdown voltage with and without the cathodic etching step is shown in FIGS. 2A and 2B. It is seen that the inventive technique disclosed herein results in an increase in the yield of capacitors having breakdown voltages ranging beyond 80 volts direct current.

Figure 3B:
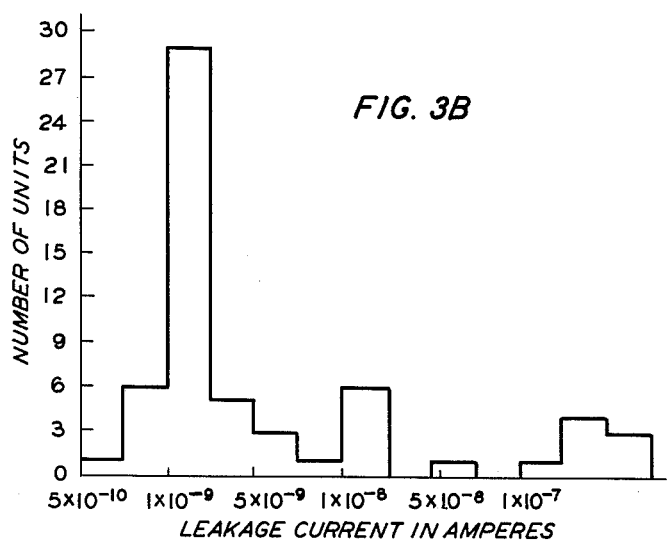
FIG. 3B is a histogram of capacitor leakage current at 75 volts after cathodic etching on coordinates of number of units against leakage current in amps.

Similarly, the histograms shown in FIGS. 3A and 3B reveal that the inventive cathodic etching step results in an increase in the yield of capacitors having leakage currents at 75 volts in the range of $5 \times 10^{-10}$ to $1 \times 10^{-8}$ amperes.

While the invention has been described in detail in the foregoing description and the drawing similarly illustrates the same, the aforesaid is by way of illustration only and is not restrictive in character. The several modifications which will readily suggest themselves to persons skilled in the art are all considered within the broad scope of the invention, reference being had to the appended claims.

What is claimed is:

1. The method of fabricating a capacitor which comprises the steps of producing a first electrode by depositing a layer of a film-forming metal on a substrate by condensation, anodizing the said film-forming metal to form a dielectric oxide film thereover, immersing the anodized first electrode in an electrolyte having a pH less than 9, biasing said anodized first electrode cathodically, thereby causing an electric current flow between said electrolyte and said first electrode immersing said anodized first electrode in a nonaqueous solution comprising ions of at least one halogen, biasing said anodized first electrode anodically, thereby causing an electric current flow between said first electrode and said nonaqueous solution, and causing said film-forming metal to go into solution at imperfection sites, reanodizing said first electrode and depositing a second electrode such that said dielectric oxide film is interposed between said first and said second electrodes.

2. The method of claim 1 wherein said film-forming metal is tantalum and said electrolyte consists essentially of a 0.1 percent by weight solution of citric acid in distilled water.

3. The method of claim 1 in which said first electrode is a porous structure consisting essentially of a film-forming metal and in which a solid electrolyte is interposed between said dielectric oxide film and said second electrode.

4. The method of claim 1 in which a liquid electrolyte is interposed between said dielectric oxide film and said second electrode.

5. The method of claim 1 wherein said film-forming metal is tantalum, said electrolyte consists essentially of a 0.1 percent by weight solution of citric acid in distilled water and said non-aqueous solution is a 0.01 percent by weight solution of aluminum chloride in methanol.

References Cited in the file of this patent

UNITED STATES PATENTS

| | | |
|---|---|---|
| 2,035,022 | Robinson | Mar. 24, 1936 |
| 2,122,392 | Robinson | June 28, 1938 |
| 2,267,717 | Brennan | Dec. 30, 1941 |
| 2,607,825 | Eisler | Aug. 19, 1952 |
| 2,780,594 | Dailey | Feb. 5, 1957 |
| 2,863,811 | Ruscetta et al. | Dec. 9, 1958 |
| 3,079,536 | McLean | Feb. 26, 1963 |

FOREIGN PATENTS

| | | |
|---|---|---|
| 835,091 | Great Britain | May 18, 1960 |